July 18, 1967

G. B. LOPER ETAL 3,332,058

DEPTH CONTROL SYSTEM FOR MARINE SEISMIC SURVEYING

Original Filed June 17, 1963

*INVENTORS.*
GEORGE B. LOPER
JULIUS PODHRASKY, JR.

BY

*Arthur F. Zobal*

ATTORNEY

3,332,058
DEPTH CONTROL SYSTEM FOR MARINE SEISMIC SURVEYING

George B. Loper and Julius Podhrasky, Jr., Dallas, Tex., assignors to Mobil Oil Corporation, a corporation of New York
Continuation of application Ser. No. 288,180, June 17, 1963. This application Nov. 25, 1966, Ser. No. 597,173
9 Claims. (Cl. 340—7)

This application is a continuation of application Ser. No. 288,180 filed on June 17, 1963, and now abandoned.

This invention relates to seismic surveying of underwater geologic formations and more particularly to the reduction of unwanted noise in seismic surveying and has for an object the provision of an improved system for maintaining a seismic spread at a constant depth during towing operations to reduce noise thereby obtaining improved results in continuous seismic operations.

In present day marine seismic operations, continuous seismograms are produced by repetitively producing seismic disturbances in water from a moving vessel at short time periods, for example, every six seconds. To carry out these operations, the detector system of a seismic spread towed behind the vessel continuously detects reflected signals during the towing operations. In conventional towing systems, the front end of the spread is supported below the surface by fixedly and directly coupling the front of the spread to a suitable float which is towed behind the towing vessel. The difficulty with such a system is that wave action imparts an up and down motion to the float which in turn is transmitted directly to the seismic spread thereby creating unwanted noise.

In accordance with the present invention, a system is provided for towing a seismic spread at a constant and desired depth without the use of a surface float thereby reducing noise. More particularly, the system includes an inclosed container or flotation chamber for maintaining a seismic spread at a constant depth below the surface of water. The container is adapted to be towed below the surface of water by a vessel and has at least one inlet and outlet port for water. Conduit means is provided which has a first end coupled to the interior of the container a second end extending to the surface. At the surface, means is provided for supplying gas to the container. In addition, control means is coupled to the conduit for controlling the flow of gas into and from the container to control the amount of water therein for varying the buoyancy of the container to maintain the container at a desired depth.

In a more particular aspect, the second end of the conduit extends to the tow vessel where the control means is coupled to a means for pumping air into and from the container. The depth of the container is automatically adjusted by the provision of a pressure-sensitive means which produces an output of amplitude and phase indicative of deviation from a given depth, which means is coupled to the container and to the control means. The control means is responsive to the phase and amplitude of the pressure-sensitive means for controlling the flow of air into and from the container.

For further objects and advantages of the invention and for a more complete description thereof, reference may now be had to the following description taken in conjunction with the accompanying drawing in which:

FIGURE 1 schematically illustrates the system of the present invention for maintaining a seismic spread at the constant depth;

Figure 1:
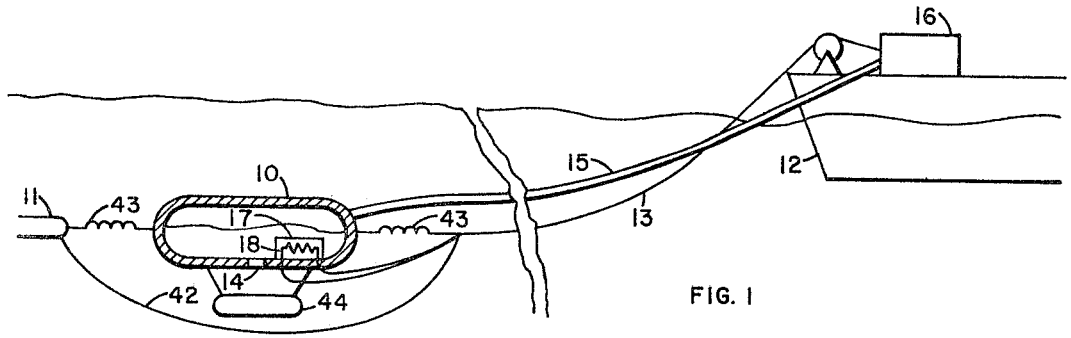

Referring now to FIGURE 1, there will be described the system of the present invention for maintaining a seismic spread at a constant depth. More particularly, the system includes an enclosed container 10 coupled to a seismic spread 11 and to a tow vessel 12 by way of cable 13. An inlet and outlet port 14 for water is located in the bottom of the container 10. The buoyancy of the container is varied by injecting and withdrawing gas from the container to control the amount of water therein. This is accomplished by the provision of a flexible conduit 15 leading from the interior of the container to system 16 located on the vessel 12. The system 16 includes means for supplying gas to the container by way of conduit 15. The container 10 is automatically maintained at a constant depth by the use of a pressure-sensitive means 17 located in the container 10 and which automatically controls the flow of gas into and from the container.

Figure 2:
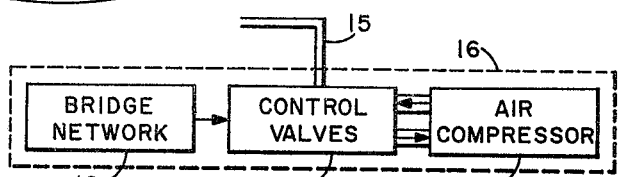
FIGURE 2 illustrates, in block diagram, a control system employed in the system of FIGURE 1.

More particularly, in a preferred embodiment, the depth or pressure-sensitive means 17 comprises a pressure-sensitive transducer which includes a resistive element 18, the resistance of which varies in proportion to depth or hydrostatic pressure. The resistance of element 18 is balanced against a reference resistance in a bridge network on the boat and illustrated at 19 in FIGURE 2. The error output from the bridge is amplified to control a valve arrangement 20 coupled to an air compressor or pump 21 for positively controlling the flow of air into and from the container 10 by way of conduit 15. An advantage of such a system is that it is simple yet rugged in that no moving parts are employed on the container which otherwise would be subject to the corrosive actions of the water. Furthermore, the transducer employed requires very little current, for example, a few milliamps. Thus, mechanical and electrical noise is reduced to a minimum which otherwise would affect the seismic record. In addition, an unlimited supply of air is provided by way of conduit 15 for controlling the depth of the container 10.

Figure 3:
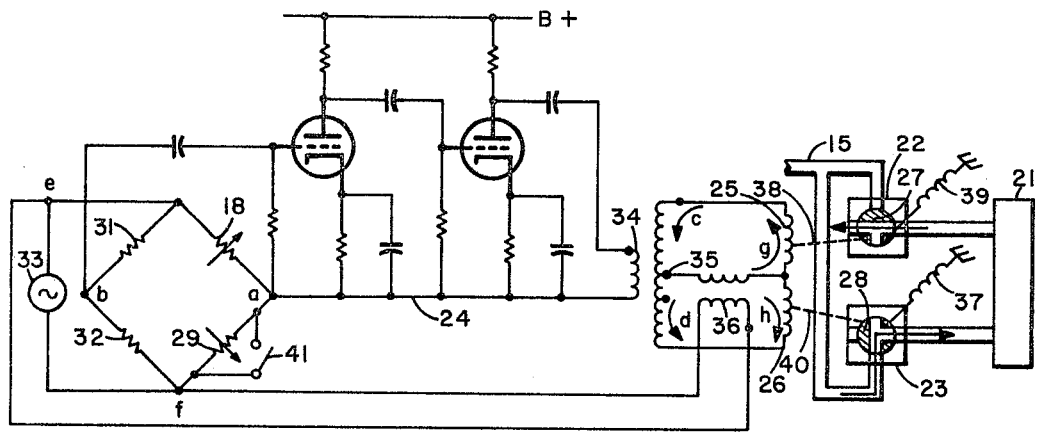
FIGURE 3 illustrates the circuitry of the control system of FIGURES 1 and 2.

Referring now to FIGURES 3 and 4, there will be described the operation of the bridge network 19 for controlling the valve arrangement 20 which comprises two three-way valves 22 and 23 coupled to air compressor 21. The bridge comprises the resistive element 18 connected so that the resistance thereof increases as the depth and hence as the pressure increases and conversely decreases as the depth increases. Coupled to resistive element 18 is a two-stage amplifier 24, the output of which is coupled to two valve actuating coils 25 and 26. These coils control the movement of valve elements 27 and 28 respectively of valves 22 and 23 to control the flow of air into and from conduit 15. As the depth of container 10 sinks below the desired depth, coils 25 and 26 are operated to allow air to be injected into conduit 15 to force water from container 10 by way of port 14 to increase the buoyancy of container 10, thereby allowing the container to rise. Conversely, if the container rises above the desired depth, air is withdrawn from the container to decrease the buoyancy.

More particularly, the bridge also comprises a variable resistor 29 which is located on the vessel 12 and which is employed to initially adjust the depth at which container 10 is to be maintained. Coupled across resistive element 18 and resistor 29 and across fixed and equal resistors 31 and 32 is an A-C power supply 33. The amplifier 24 is coupled at the juncture of element 18 and resistor 29 and at the juncture of resistors 31 and 32, respectively, at points $a$ and $b$. The output of the second stage of amplifier 24 is coupled to the primary of transformer 34. The secondary of this transformer is center tapped at 35 and coupled at the juncture of the two valve coils 25 and 26. Also coupled to power supply 33 is transformer 36, the secondary of which is coupled to center tap 35 and at the juncture of the valve coils 25 and 26. Briefly, when the container is at the desired depth as set by resistor 29, the resistance of element 18 is equal to that of resistor 29. The voltage at point *a* is equal to that at point *b* and zero output is applied to amplifier 24. When the depth deviates from the desired depth, however, the resistance of element 18 changes and an error output is applied to amplifier 24. The error output is amplified and applied to actuate either of coils 25 or 26 to allow air to flow into or from container 10. The operation of the bridge will become apparent from the following examples now to be given.

Figures 4A, 4B:
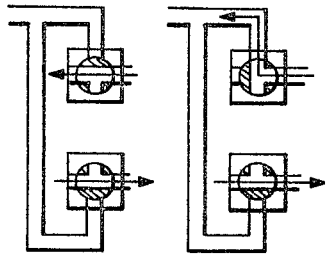
FIGURES 4A and 4B illustrate valve positions of the control system.

When the container 10 is at the surface, air is injected into the container to keep the water out as will be described hereinafter. When it is desired to position contained 10 at a desired depth, resistor 29 is adjusted to a predetermined value determined from prior calibration, for example, to 2,500 ohms. The resistances of resistors 31 and 32, for example, each may be of the order of 2,500 ohms. At the surface, the resistance of element 18 is smaller than 2,500 ohms. When point *e* is positive with respect to point *f* the voltage at point *a* is more positive than the voltage at point *b*. Thus, the grid of the first stage of amplifier 24 is negative with respect to the cathode. This, in turn, produces a negative output from the anode of the second stage of amplifier 24. From the dot convention shown, current will flow in the secondary windings of transformer 34 in the direction of arrows *c* and *d*. At this instant, as the output from A-C power supply 33 becomes positive at point *e* with respect to point *f*, from the dot convention shown, current will flow in the secondary of the transformer 36 in the direction of arrows *g* and *h*. Thus, the currents illustrated at *c* and *g* are additive, thereby causing valve coil 25 to become energized. Currents illustrated at *d* and *h* flow in opposite directions to cause coil 26 to become de-energized. When this occurs, control element 28 of valve 23 is moved by biasing spring 37 to the position illustrated to allow compressor 21 to withdraw air from container 10. When coil 25 is energized, mechanical connections 38 overcomes the bias of spring 39 and moves control element 27 of valve 22 to the position illustrated to prevent air from flowing into conduit 15. When air is withdrawn from container 10, water enters the container by way of port 14, thereby causing the container 10 to sink. As the container sinks, the resistance of element 18 increases due to the increase in pressure. The container 10 will continue to sink until the resistance of element 18 equals the resistance of resistor 29. When this occurs, there is no current flow in the primary hence in the secondary of the transformer 34. Thus, equal amounts of current from the secondary of transformer 36 flow through the coils 25 and 26 thereby causing both coils to become energized. In the energized condition, mechanical connections 38 and 40 move control elements 27 and 28 to a position wherein air is neither withdrawn nor injected into the conduit 15, thereby allowing the container 10 to remain at the desired depth. FIGURE 4A illustrates the position of control elements 27 and 28 when coils 25 and 26 are both energized.

If, for some reason, the depth of the container 10 sinks below the desired depth, due, for example, to a change in speed of the tow vessel 12, the resistance of element 18 will increase, thereby becoming greater than the resistance 29. When *e* is positive with respect to *f*, the voltage at point *a* will be negative with respect to point *b*, and the voltage applied to the grid of the first stage of amplifier 24 will be positive with respect to the cathode. When this occurs, the current flow in the secondary of transformer 34 will be in a direction opposite the direction of arrows *c* and *d*. Thus, valve coil 25 will become de-energized and valve coil 26 will be energized. When this occurs, control elements 27 and 28 will be moved to the positions illustrated in FIGURE 4B to allow air to flow into conduit 15, thereby forcing water out of container 10 to raise the level of the container. As the container 10 rises, the resistance of element 18 will decrease until it reaches that of resistor 29 wherein coils 25 and 26 both will become energized to stop the flow of air into conduit 15 to maintain the container 10 at the desired depth.

When the vessel 12 initially tows the spread to the desired seismic surveying position, air is injected into container 10 to maintain the container and spread at the surface. Switch 41 is provided to carry out this function. When the switch is closed, resistor 29 is short circuited. As now can be understood, the input to the grid of the first stage of amplifier 24 is positive with respect to the cathode and the output of amplifier 24 causes valves 22 and 23 to be actuated to allow air to flow into container 10.

Referring again to FIGURE 1, it can be seen that the leads of resistive element 18 extends to the control system 16 by way of the cable 13. The output of seismic spread 11 is applied to conductor 42, which also extends through the cable 13 to a recording system (not shown) on the vessel 12. The seismic spread 11 is a conventional spread, which is neutrally buoyant in that it barely floats in water and is thus maintained at the depth of container 10. Resilient springs 43 and the weight of the container 10 together act to absorb jerking motions imparted by the towing operations to reduce noise further. A weighted keel 44 is provided to maintain the container 10 in an upright position.

In one embodiment, the transducer 18 was a type 401 pressure transducer, produced by Colvin Laboratories, Inc., East Orange, N.J. The transducer included a 5000 ohm potentiometer resistance. The power supply 33 was a 24-volt, 60-cycles per second power supply. The valves 22 and 23 were a Marsh Type 36 three-way solenoid valve, direct acting and spring loaded, produced by Marsh Instrument Company, Skokie, Ill.

While the invention has been described in connection with a specific embodiment thereof, it will be understood now that further modifications will suggest themselves to those skilled in the art and it is intended to cover such modifications as fall within the scope of the appended claims.

We claim:

1. A system for controlling the depth of a marine seismic detector cable which is towed behind a vessel, comprising:

a flotation chamber for attachment to said detector cable, said flotation chamber having means for admitting and discharging water into and out of said chamber, a source of compressed gas for mounting on said vessel, conduit means for coupling the interior of said flotation chamber to said source of compressed gas, and control means for mounting on said vessel and for controlling the injection of said gas via said conduit means into said flotation chamber to discharge the water therein and increase the buoyancy thereof, thus causing said flotation chamber and said detector cable to rise, said control means being operable to withdraw the gas from said flotation chamber via said conduit means, thus permitting admittance of water therein to cause decrease in buoyancy thereof and consequent lowering of said flotation chamber and said detector cable.

2. The system of claim 1 further comprising:

a depth-sensitive means for producing an output signal representative of the depth of said detector cable, and valve means for mounting on said vessel and for adjusting said control means in accordance with said output signal.

3. A system for maintaining at a predetermined constant depth, a marine seismic detector cable which is towed behind a vessel in a body of water, said system comprising:

an elongated container for attachment to said detector cable and adapted to be towed underwater, the outer wall of said container forming an interior flotation chamber, said container having an air port in the front portion thereof, said container having a water port which, during operation of the system, is at a level below that of said air port, said water port being adapted for transferring water from the body of water into and out of said flotation chamber, a source of compressed air for mounting on said vessel, valve means, for mounting on said vessel and for coupling to said source of compressed air.

a conduit for coupling said air port of said container to said valve means, depth-sensitive means for producing an output signal representative of the depth of said detector cable, and, said valve means being adjustable according to said output signal to control the injection of said gas via said conduit into said flotation chamber to discharge the water therein through said water port and increase the buoyancy of said container, thus causing said container and said detector cable to rise, said valve means being operable to withdraw via said conduit the gas in said flotation chamber, thus permitting the admittance of water therein through said water port to decrease the buoyancy of said container and consequent lowering of said container and said detector cable.

4. A depth-control system for marine seismic surveying comprising an enclosed container for maintaining a seismic spread at a constant and desired depth below the surface of water, said container being adapted to be towed below the surface of water by a vessel and having at least one inlet and outlet port for water, conduit means having a first end coupled to the interior of said container and a second end extending to the surface, and means coupled to said second end for pumping air into and from said container by way of said conduit for varying the buoyancy of said container to maintain said container at said desired depth.

5. A depth-control system for marine seismic surveying comprising an enclosed container for maintaining a seismic spread at a constant and desired depth below the surface of the water, said container being adapted to be towed below the surface of the water by a vessel and having at least one inlet and outlet port for water, conduit means having a first end coupled to the interior of said container and a second end extending to the surface, depth-sensitive means located within said container for producing output signals in response to variations in the depth of said container, pump means disposed on the surface for pumping gas into and out of said container by way of said conduit, and control means responsive to said output signals and coupled to said second end of said conduit and said pump means for selecting and regulating the flow of gas pumped into and from said container to thus vary the buoyancy thereof in maintaining said container at said desired depth.

6. A depth-control system for marine seismic surveying comprising an enclosed container for maintaining a seismic spread at a constant and desired depth below the surface of the water, said container being adapted to be towed below the surface of the water by a vessel and having at least one inlet and outlet port for water, a conduit having a first end coupled to the interior of said first container and second end extending to the surface, depth-sensitive means located within said container for producing output signals in response to variations in the depth of said container, pump means disposed on the surface, and control means responsive to said output signals and coupled to said pump means and said second end of said conduit for selectively connecting said pump means with said conduit to cause gas to be pumped into or from said container to vary the buoyancy thereof in maintaining said container at the desired depth.

7. The depth-control system of claim 6 wherein said control means closes said second end of said conduit when said container reaches the desired depth to prevent further delivery of air to or from said container.

8. A depth-control system for marine seismic surveying comprising an enclosed container for maintaining a seismic spread at a constant and desired depth below the surface of the water, a conduit connected to said container and extending to the surface, gas pump means having intake and discharge ports, an alternating current source, means connected to said alternating current source for generating an output function, the phase and amplitude of which is indicative of the direction and extent of deviation of said container from a predetermined depth, and valve control means responsive to the phase comparison of said output function with said alternating current source to close said conduit when said output function is of zero amplitude and selectively open said conduit to said intake and discharge ports of said gas pump in accordance with said phase comparison to cause gas to be pumped to or from said container and vary the buoyancy thereof in accordance with the container's deviation from the desired depth.

9. The depth-control system of claim 8 in which said valve control means includes two solenoid actuated valves connected to said intake and discharge ports of said gas pump means and having their respective operating coils directly in circuit one with another and inductively coupled in series opposition relationship with said alternating current source and in series aiding relationship with said output function, said valves assuming the same valve position upon said output function reaching zero and assuming opposite valve positions dependent upon the phase comparison of said reference source with said output function when said output function is other than zero.

No references cited.

SAMUEL FEINBERG, *Primary Examiner.*

P. A. SHANLEY, *Assistant Examiner.*

UNITED STATES PATENT OFFICE
CERTIFICATE OF CORRECTION

Patent No. 3,332,058                                            July 18, 1957

George B. Loper et al.

It is hereby certified that error appears in the above numbered patent requiring correction and that the said Letters Patent should read as corrected below.

Column 1, line 44, after "container" insert -- and --; column 2, line 48, for "increases" read -- decreases --; column 3, lines 17 and 18, for "contained" read -- container --; lines 42 and 43, for "connections" read -- connection --; line 52, after "primary" insert -- and --; column 4, line 20, for "extends" read -- extend --; column 5, line 15, for "means," read -- means --; line 16, for "air." read -- air, --; column 6, lines 50 and 51, for "alternatng" read -- alternating --.

Signed and sealed this 18th day of June 1968.

(SEAL)
Attest:

Edward M. Fletcher, Jr.                                      EDWARD J. BRENNER

Attesting Officer                                                  Commissioner of Patents